Patented June 30, 1925.

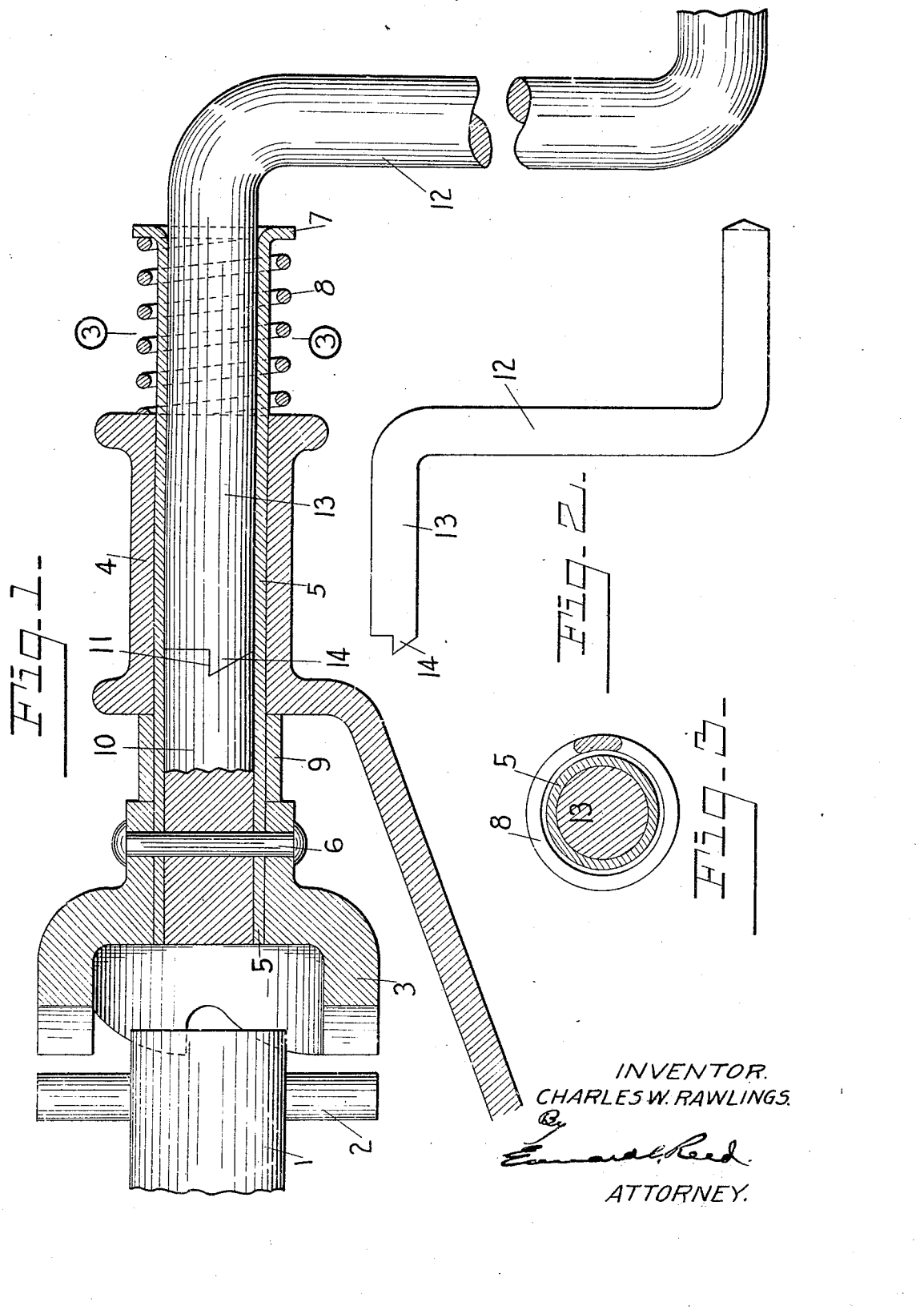

1,544,179

UNITED STATES PATENT OFFICE.

CHARLES W. RAWLINGS, OF FAIRFIELD, OHIO.

DETACHABLE CRANK FOR AUTOMOBILE ENGINES AND THE LIKE.

Application filed November 3, 1924. Serial No. 747,502.

*To all whom it may concern:*

Be it known that I, CHARLES W. RAWLINGS, a citizen of the United States, residing at Fairfield, in the county of Green and State of Ohio, have invented certain new and useful Improvements in Detachable Cranks for Automobile Engines and the like, of which the following is a specification, reference being had therein to the accompanying drawing.

This invention relates to detachable cranks for automobile engines and the like and is designed more particularly for the purpose of substituting a detachable crank for the usual permanently attached crank of a Ford automobile.

One object of the invention is to provide means whereby a detachable crank may be operatively connected with the usual cranking clutch on the engine shaft of an automobile, without material modification of the associated mechanism.

A further object of the invention is to provide a cranking device having a detachable crank and which may be quickly and easily applied to automobiles; which will be of a strong durable construction; which may be produced at a relatively low cost.

Other objects of the invention will appear as the device is described in detail.

In the accompanying drawings Fig. 1 is a longitudinal sectional view taken cantrally through a cranking apparatus embodying my invention; Fig. 2 is a side elevation of the crank; and Fig. 3 is a transverse section taken on the line 3—3 of Fig. 1.

In these drawings I have illustrated one embodiment of my invention and have shown the same as designed primarily for attachment to a Ford automobile but it will be understood that this particular embodiment has been chosen for the purposes of illustration only and that the invention may take various forms and may be applied to internal combustion engines of various kinds without departing from the spirit thereof.

In the ordinary Ford automobile the engine shaft 1 is provided at its forward end with a cranking clutch which consists of a clutch member 2 rigidly secured to the engine shaft and a second clutch member 3 movable into and out of cooperative engagement with the fixed clutch member. Permanently secured to the second clutch member is a crank which is journaled in a bearing 4 mounted upon the frame of the automobile and the handle portion of which projects forwardly beyond that bearing. In order to provide a detachable crank for such an engine, which may be installed with little or no modification of the other parts of the mechanism, I disconnect the crank from the clutch member 3 and substitute therefor a special cranking mechanism which consists of a sleeve 5 rotatably and slidably mounted in the bearing 4, from which the usual crank has been removed, and which is rigidly secured to the cranking clutch member 3. Preferably the sleeve is inserted in the opening in the clutch member 3, from which the usual crank was removed, and is rigidly secured therein in any suitable manner, as by means of a pin 6 extending through the hub of the clutch member and through the sleeve. The sleeve extends beyond the forward end of the bearing 4 and is provided with an outwardly extending flange 7 and between this flange and the end of the bearing 4 a spring 8 is coiled about the sleeve and tends to move the sleeve forwardly so as to hold the clutch member 3 normally out of engagement with the clutch member 2 on the engine shaft. The sleeve may, if desired, be provided with a suitable stop, such as a collar 9, to limit the forward movement of the sleeve and clutch member. Mounted within the sleeve and rigidly secured thereto is one member of a second clutch. This clutch member may be of any suitable character and will be mounted in the sleeve in any suitable manner but, in the present instance, I have shown the same as comprising a bar of metal 10 fitted snugly within the sleeve and secured thereto and to the clutch member 3 by the pin 6. This bar of metal is provided at its forward end with a clutch face which, in the present instance, consists of recesses 11 formed in the end of the bar. The crank itself consists of a handle portion 12 and a longitudinally extending portion 13 which is adapted to enter the forward end of the sleeve 5 and is provided at its rear or inner end with a clutch member 14, which, in the present mechanism, consists of integral lugs adapted to enter the recesses 11 in the fixed clutch member 10.

To crank the engine the longitudinal portion 13 of the crank is inserted in the sleeve and pressed forwardly, thereby forcing the sleeve and the clutch member 3 rearwardly and causing the latter to engage the clutch member 2 on the engine shaft, after which the crank is rotated to impart movement to the sleeve and clutch member 3, thereby turning over the engine and effecting the starting thereof. When the engine is started the crank may be withdrawn.

While I have shown and described one embodiment of my invention I wish it to be understood that I do not desire to be limited by the details thereof as various modifications may occur to a person skilled in the art.

Having now fully described my invention, what I claim as new and desire to secure by Letters Patent, is:

1. In a device of the character described, a bearing, a sleeve rotatably and slidably mounted in said bearing, a clutch member connected with said sleeve and adapted to engage a cooperating clutch member on an engine shaft, a clutch member mounted within said sleeve and held against rotation relatively thereto, and a crank having a part adapted to enter said sleeve and provided with a clutch member to engage the clutch member within said sleeve.

2. In a device of the character described, a bearing, a sleeve rotatably and slidably mounted in said bearing, said sleeve projecting beyond the forward end of said bearing and having an outwardly extending flange, a spring confined between said flange and said bearing, a clutch member connected with said sleeve, and adapted to engage a cooperating clutch member on an engine shaft, a clutch member mounted within said sleeve and held against rotation relatively thereto, and a crank having a part adapted to enter said sleeve and provided with a clutch member to engage the clutch member within said sleeve.

3. In a device of the character described, a bearing, a sleeve rotatably and slidably mounted in said bearing, a clutch member connected with said sleeve and adapted to engage a cooperating clutch member on an engine shaft, a clutch member comprising a bar fitted within and rigidly secured to said sleeve, and having a clutch face at the front end thereof, and a crank having a portion adapted to enter said sleeve and having at its inner end a clutch face to cooperate with the other clutch member within said sleeve.

4. In an automobile, the combination with an engine shaft, a clutch member carried thereby, a second clutch member movable into and out of engagement with the first mentioned clutch member, and a bearing arranged in line with said shaft, of a sleeve rotatably and slidably mounted in said bearing and forming a support for the last mentioned clutch member, a clutch member mounted within said sleeve, and a crank having a part to enter said sleeve and provided with a clutch member to engage the other clutch member within said sleeve.

5. In an automobile, the combination with an engine shaft, a clutch member carried thereby, a second clutch member to cooperate with the first mentioned clutch member, said second clutch member having a hub portion to receive a supporting structure, and a bearing arranged in line with said engine shaft, of a sleeve slidably and rotatably mounted in said bearing and having its inner end extending into and rigidly secured to the hub of said second clutch member, a clutch member mounted within said sleeve and held against rotation relatively thereto, and a crank having a part adapted to enter said sleeve and provided with a clutch face to engage the other clutch member within said sleeve.

6. In a device of the character described, a rotatable and slidable sleeve having one end adapted to be secured to and to support one member of the cranking clutch of an automobile, a clutch member arranged within said sleeve and held against rotation relatively thereto, and a crank having a portion to enter said sleeve and provided with a clutch face to engage the other clutch member within said sleeve.

7. In a device of the character described, a rotatable and slidable sleeve, a bar fitted within one end of said sleeve and provided at its forward end with a clutch face, said sleeve and said bar being adapted to extend into the hub of one member of the cranking clutch of an automobile and to support said clutch member, means for rigidly securing said sleeve and said bar to said clutch member, a spring to act on said sleeve to move the same in one direction, and a crank having a part adapted to extend into said sleeve and provided with a clutch face to engage the clutch face on the end of said bar.

8. In an automobile, the combination with an engine shaft, a clutch member carried thereby, a second clutch member movable into and out of engagement with the first mentioned clutch member, and a bearing arranged in line with said shaft, of a sleeve rotatably and slidably mounted in said bearing and forming a support for the last mentioned clutch member, a spacing member interposed between said last mentioned clutch member and said bearing, to limit the outward movement of said sleeve, and a crank having a part to enter said sleeve and provided with a clutch member to engage the other clutch member within said sleeve.

In testimony whereof, I affix my signature hereto.

CHARLES W. RAWLINGS.